(12) United States Patent
Rasmussen et al.

(10) Patent No.: US 6,571,000 B1
(45) Date of Patent: May 27, 2003

(54) IMAGE PROCESSING ALGORITHM FOR CHARACTERIZATION OF UNIFORMITY OF PRINTED IMAGES

(75) Inventors: D. Rene Rasmussen, Pittsford, NY (US); Edul N. Dalal, Webster, NY (US); Bimal Mishra, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/450,180

(22) Filed: Nov. 29, 1999

(51) Int. Cl.[7] .................................................. G06K 9/00
(52) U.S. Cl. ........................ 382/112; 382/167; 382/224; 382/275; 358/1.9; 358/3.26; 358/518
(58) Field of Search ........................ 382/112, 162–167, 382/191, 195, 202, 224, 274, 275, 280; 358/1.9, 3.26, 518, 530

(56) References Cited

U.S. PATENT DOCUMENTS

| | | |
|---|---|---|
| 4,071,911 A | 1/1978 | Mazur |
| 4,086,434 A | 4/1978 | Bocchi |
| 4,583,834 A | 4/1986 | Seko et al. |
| 5,038,319 A | 8/1991 | Carter et al. |
| 5,057,866 A | 10/1991 | Hill, Jr. et al. |
| 5,084,875 A | 1/1992 | Weinberger et al. |
| 5,365,310 A | 11/1994 | Jenkins et al. |
| 5,510,876 A | 4/1996 | Hayashi et al. |
| 5,510,896 A | 4/1996 | Wafler |
| 5,606,432 A * | 2/1997 | Ohtsuka et al. ............. 358/501 |
| 5,612,902 A | 3/1997 | Stokes |
| 5,619,307 A | 4/1997 | Machino et al. |
| 5,642,202 A * | 6/1997 | Williams et al. ............. 358/296 |
| 5,668,890 A * | 9/1997 | Winkelman .................. 345/604 |
| 5,680,541 A | 10/1997 | Kurosu et al. |
| 5,694,528 A | 12/1997 | Hube |
| 5,748,221 A | 5/1998 | Castelli et al. |
| 5,884,118 A | 3/1999 | Mestha et al. |
| 6,023,525 A | 2/2000 | Cass |
| 6,023,595 A | 2/2000 | Suzuki et al. |
| 6,151,410 A * | 11/2000 | Kuwata et al. .............. 382/162 |
| 6,208,431 B1 * | 3/2001 | Lee et al. .................... 358/1.9 |
| 6,269,182 B1 * | 7/2001 | Ishii .......................... 356/418 |

FOREIGN PATENT DOCUMENTS

| EP | 0 854 632 A2 | 7/1998 |

OTHER PUBLICATIONS

Remote Diagnostics Systems, Paul F. Morgan, Xerox Disclosure Journal, vol. 3, No. 3, May/Jun. 1978, pp. 191–192x.
Event–based architecture for real–time fault diagnosis, Real Time Fault Monitoring of Industrial Processes, A.D. Pouliezos & G.S. Staverakakis, Kluwer Academic Publishers, 1994, pp. 284–287.

(List continued on next page.)

*Primary Examiner*—Jon Chang
*Assistant Examiner*—Charles Kim
(74) *Attorney, Agent, or Firm*—Oliff & Berridge, PLC (57) ABSTRACT

This invention specifically covers one of the many image quality (IQ) metrics that can be part of an overall image quality analysis engine. The specific problem with image quality addressed with this metric is that of a region of a printed (or copied) image, which was intended to have a uniform color, but which shows visible color variations. The color variation can have many different forms, both with respect to the type of color difference and with respect to the spatial nature of the non-uniformities. The image quality analysis system readily distinguishes between non-uniformities in the following different categories, including: (a) amplitude modulated cluster dot halftone patterns; (b) frequency modulated halftone patterns (e.g., stochastic screens); (c) irregular two-dimensional variations from noise; (d) isolated (non-periodic) one-dimensional streaks; (e) periodic, one-dimensional bands; and (f) two-dimensional periodic variations (Moire). The results from the image quality analysis can then be used as a basis for diagnosing machine problems.

22 Claims, 5 Drawing Sheets

OTHER PUBLICATIONS

Fault Diagnosis in Dynamic Systems Using Analytical and Knowledge–based Redundancy—A Survey and Some New Results, Paul M. Frank, Automatica, vol. 26, 90 International Federation of Automatic Control, 1990, pp. 459–474.

Combining Expert System and Analytical Redundancy Concepts for Fault–Tolerant Flight Control, David A. Handelman and Robert F. Stengel, Princeton University, J. Guidance, vol. 12, No. 1, Jan.–Feb. 1989, pp. 39–45.

* cited by examiner

IMAGE PROCESSING ALGORITHM FOR CHARACTERIZATION OF UNIFORMITY OF PRINTED IMAGES

BACKGROUND OF THE INVENTION

1. Field of Invention

The invention relates to an image quality analysis system and method that can discern and quantify problems with color non-uniformity.

2. Description of Related Art

It is well known that customer satisfaction can be improved and maintenance costs reduced if problems with copiers and printers can be fixed before they become serious enough to warrant a service call by the customer. While current technology exists to enable printers and copiers to call for service automatically when sensors detect certain operating parameters outside of permissible ranges, there is not a very comprehensive manner of detecting incipient system failure or automatically diagnosing when problems with image quality reach a level where human observers perceive a reduction in quality. This is caused not only by the large number of operating parameters that would need to be tracked, but also because these parameters are strongly coupled to one another. That is, a given parameter at a certain value may or may not be a problem depending on the values of other parameters. While existing systems provide some level of image quality analysis, these systems have been found less than satisfactory as image quality determination is machine dependent and may be inconsistent with perceptions of image quality as judged by human users.

Of particular importance in determining overall image quality is resolving problems with color non-uniformity. However, there are several reasons why color may be non-uniform and mere identification of image quality as it pertains to color uniformity does not resolve identification of the sources of the non-uniformity or provide insight into diagnosis of such problems.

SUMMARY OF THE INVENTION

There is a need for image output devices, such as printers and copiers, to better self-diagnose problems relating to image quality. Applicants have found that to comprehensively and reliably measure the system performance of a printer or copier, the image quality of the output must be measured.

There also is a need for an image quality analysis system that can not only quantify color non-uniformity, but also isolate or characterize the source of the non-uniformity so that one may better diagnose the device and determine a suitable course of action to remedy the non-uniformity.

Systems that can perform image analysis on printed test samples can be used in a variety of ways to provide solutions and value to users of digital printers and copiers, for example as the analysis engine for automatic and/or remote diagnosis of print quality problems, or for monitoring image quality as part of a print quality assurance system. The specific analysis method of this invention can for example be used as an aid in design of halftoning techniques, since it can isolate non-uniformity caused directly by the halftone from that caused by process noise.

One exemplary embodiment of the systems and methods of the invention overcomes such problems by developing powerful diagnosing tools within a digital printer or copier for self-diagnosis and evaluation of image quality. Image quality analysis can be performed to monitor many aspects of the printed output of the printing system. Of particular importance to overall image quality is color non-uniformity.

In this embodiment, the system provides: one or more digital test patterns stored in memory or on disk (or stored in hard copy form) for providing one or more hard copy test images; an input scanner that can scan the hard copy test image to form a digital raster image; and an image quality analysis module that receives information about the position of the digital raster image and produces test results relevant to determination of image quality analysis as perceived by human observers, particularly color non-uniformity. The input scanner and image quality analysis module may form part of the image output device or may be stand-alone components used to test the device. Optionally, a communication module may be provided that is capable of contacting a service department or a more sophisticated diagnostic module if further analysis or service is necessary, depending on the outcome of the image quality analysis. Alternatively, information relating to color non-uniformity may be used by a corrective procedure within the image output device being tested to correct for detected non-uniformity. The image quality analysis and any subsequent corrective procedure should preferably be based on the human visual system (HVS) such that it is possible to determine when differences in certain image quality traits are sufficiently perceived by human observers in order to decide whether corrective action is required.

This invention specifically covers one of the many image quality (IQ) metrics that can be part of an overall image quality (IQ) analysis engine. The specific problem with image quality addressed with this metric is that of a region of a printed (or copied) image, which was intended to have a uniform color, but which shows visible color variations. The color variation can have many different forms, both with respect to the type of color difference and with respect to the spatial nature of the non-uniformities.

A first aspect of the invention thus provides a way of evaluating the absolute image quality (IQ) with respect to uniformity, for example, as part of an IQ assurance inspection system. For this application it is important that the IQ can be evaluated in a manner that is applicable across all printing technologies (electrophotography, lithography, inkjet, etc.) and that the metric produces values that directly correlate with the human visual impression of the uniformity. As such, comparisons can be made across various product lines with a common IQ value.

A second aspect of the invention uses the results from the IQ analysis as part of a system for machine diagnostics. In this case, images from a printer/copier would be scanned back by a stand-alone scanner or a scanner associated with the printer/copier, and fed into an image analysis module, which would then quantify different types of non-uniformities and use this as a basis for diagnosing machine problems. For this application it is also very important to be able to distinguish between non-uniformities in the different categories, including: (a) amplitude modulated cluster dot halftone patterns; (b) frequency modulated halftone patterns (e.g., stochastic screens); (c) irregular two-dimensional variations from noise; (d) isolated (non-periodic) one-dimensional streaks; (e) periodic, one-dimensional bands; and (f) one- or two-dimensional periodic variations (Moire).

For example, non-uniformities in category (a) would be a result of the normal operation of the printer and not require any corrective action, while excessive non-uniformities in category (c) would be a diagnostic signal that the printer needs service. If separation between (a) and (c) is not made, the color variation caused by halftone screens could dominate the overall signal, and small but important variations caused by process noise may go undetected, resulting in ineffective diagnosis of printer/copier operation.

As far as the type of color variation is concerned, it may be variations purely in lightness (eCIELab L*), or it could be variations that also include hue and chroma. Although the visual perception of such variations strongly depends on the type of color variation, the invention proposed here applies equally well to all of the above-identified types.

Amplitude modulated cluster dot halftone patterns usually have a relatively high spatial frequency (e.g., 141 lines per inch). These patterns are usually not very objectionable to a human observer. This is partly because the frequency is so high that they are not easily visible, and partly because of their regular, periodic nature. On the other hand, frequency modulated halftone patterns at the same level will be visible and highly objectionable by a human observer unless these are of high spatial frequency, because their irregular nature makes the print appear "noisy". Irregular two-dimensional variations caused by various sources of noise in the printing process can form graininess or mottle in the image. For example, in an electrophotographic system, graininess is usually found in and caused by the development subsystem, while mottle is caused by an incomplete transfer of toner to substrate. Isolated (non-periodic) one-dimensional streaks, for example, can be caused by the signature of a misdirected jet for ink-jet printing. Periodic, one-dimensional bands, for example, can be caused by motion-quality problems with paper-advance mechanisms. One- or two-dimensional periodic variations known as Moire, can be caused by the interference of higher frequency periodic variations. This can be highly notable, for example, in three or four color printing when the different screens beat against each other. These are all types of non-uniformity which are addressed by the proposed technique.

BRIEF DESCRIPTION OF THE DRAWINGS

The invention will be described with reference to the following illustrative drawings, wherein like numerals refer to like elements and wherein.

DETAILED DESCRIPTION OF PREFERRED EMBODIMENTS

Figure 1:
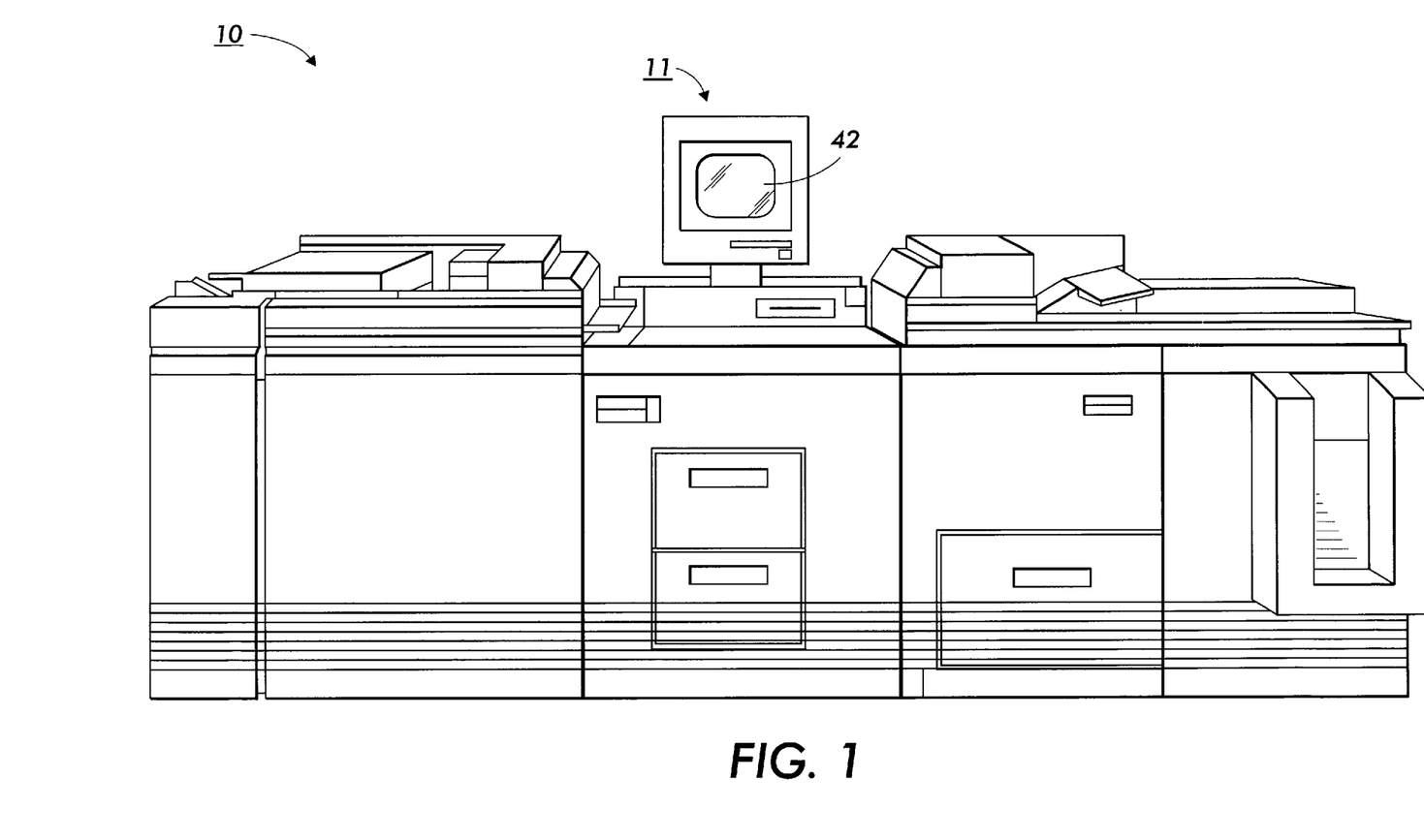
FIG. 1 shows a typical digital copier machine having a user interface suitable for use with the invention.

An exemplary device to which automatic image quality analysis is to be performed will be described with reference to FIGS. 1–3. FIG. 1 shows an image output device, in particular a digital copier machine 10, comprising a plurality of programmable components and subsystems which cooperate to carry out copying or printing jobs programmed through a touch dialog screen 42 of a user interface (UI) 11. Internal operating systems of the digital copier 10 are disclosed in U.S. Pat. Nos. 5,038,319, 5,057,866, and 5,365, 310, owned by the assignee of the present invention, the disclosures of which are incorporated herein by reference in their entirety. As such, no further detailed description thereof is necessary. Digital copier 10, however, is merely representative of a preferred printing system to which the image quality determination is made. It should be understood that a loosely coupled printing or reproducing system is also applicable for use with the invention described herein, such as a printer or facsimile device. Moreover, while there may be benefits to use of the image quality analysis on a reproduction system, such as a digital copier having an integral scanner component, the invention also is applicable to a printer used in conjunction with a stand-alone scanner, such as a flatbed type scanner.

Figure 2:
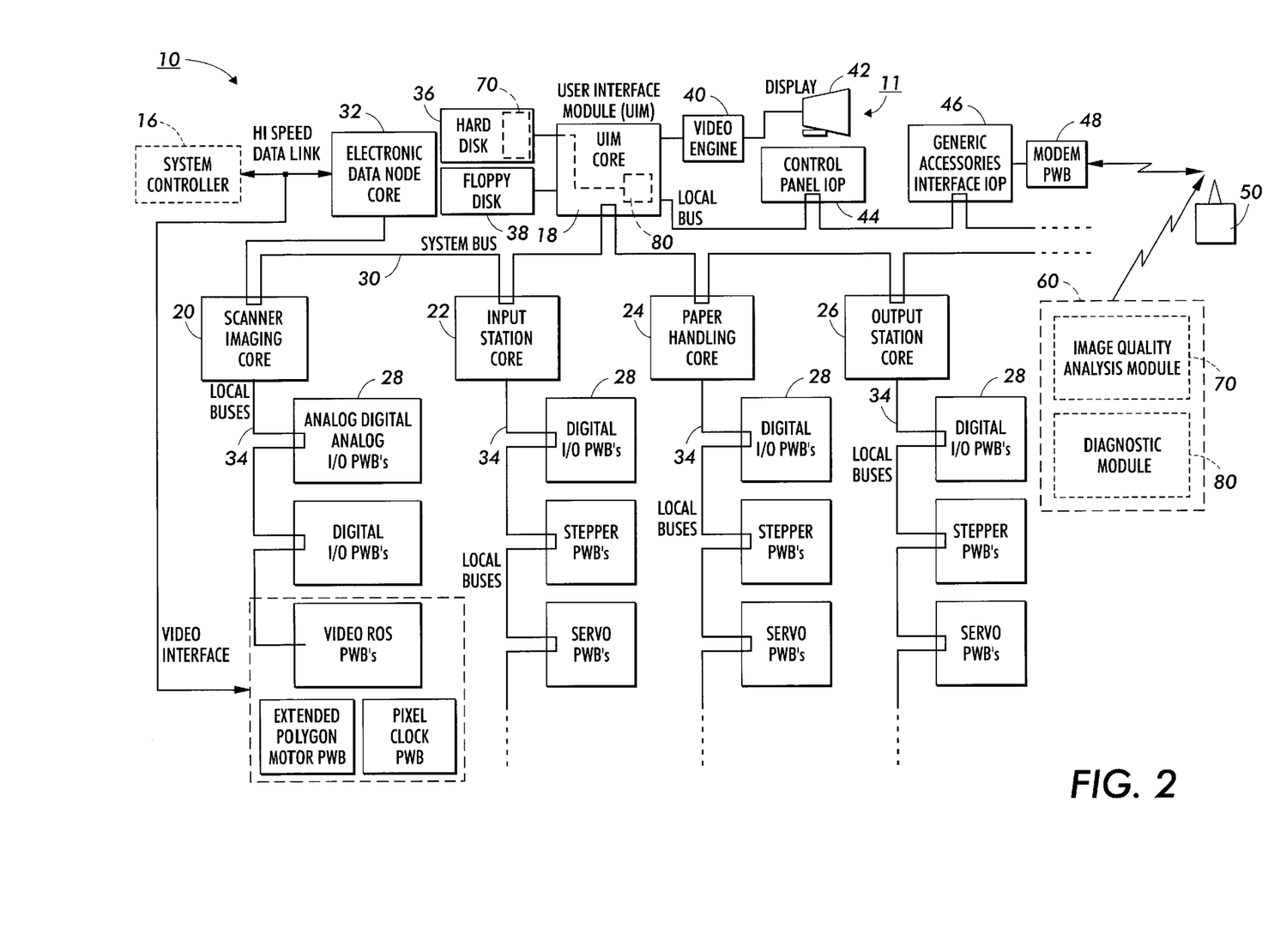
FIG. 2 is a schematic diagram of a digital copier having a user interface for communicating with a remote diagnostic computer.

Referring to FIG. 2, operation of the various components of exemplary digital copier 10 is regulated by a control system which uses operating software stored in memory in the system controller 16 to operate the various machine components in an integrated fashion to produce copies and prints. The control system includes a plurality of printed wiring boards (PWBs), there being a user interface module (UIM) core PWB 18, a scanner/imaging core PWB 20, an input station core PWB 22, a paper handling core PWB 24 and an output station core PWB 26, together with various input/output (I/O) PWBs 28. A shared line (SL) 30 couples the core PWBs 18, 20, 22, 24 and 26 with each other and with the electronic data node core 32, while local buses 34 serve to couple the PWBs to the respective cores and to stepper and servo PWBs. Programming and operating control over digital copier 10 is accomplished through touch dialog screen 42 of UI 11. The operating software includes application software for implementing and coordinating operation of system components.

Floppy disk port 38 provides program loading access to UIM core PWB 18 for the purpose of entering changes to the operating software, loading specific programs, such as diagnostic programs, and retrieving stored data, such as machine history data and fault data, using floppy disks. Hard disk 36 is used as a non-volatile memory (NVM) to store programs, machine physical data and specific machine identity information. One of the programs hard disk 36 may store is image quality analysis software that forms an image quality analysis module 70 used by the invention. Module 70 may also reside on a floppy disk used in floppy disk port 38.

UIM core PWB 18 communicates with video engine 40 for driving a suitable visual display 42, such as a CRT or flat screen of the user interface 11. The UIM core 18 also has connected thereto a control panel I/O processor 44 and a generic accessories interface I/O processor 46. The interface I/O processor 46 is in turn connected to a modem PWB 48. The modem 48 provides communication between digital copier 10 and a communications channel, such as a public switched telephone network 50 to facilitate information transfer to and from a remote diagnostic computer 60, which may also include image quality analysis module 70 as well as other diagnostic modules.

The information from the subsystem cores flows to and from the UIM core PWB 18, which embodies software control systems including a user interface system manager and a user interface manager. The UI system manager includes a UI display manager subsystem for controlling the display of messages on the display 42. A data manager subsystem provides data management to the UI system manager.

Figure 3:
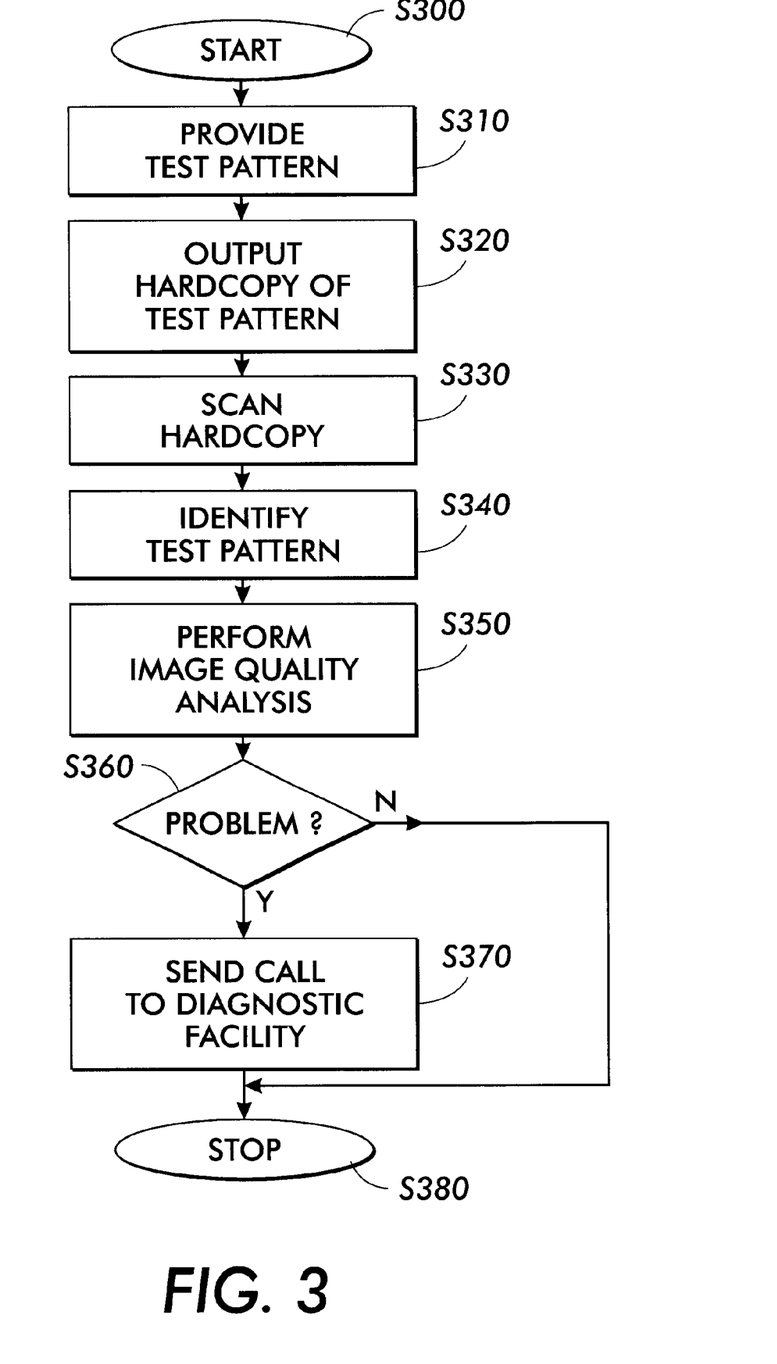
FIG. 3 is a flow chart showing an image analysis method according to the invention.

In a first embodiment of the invention, image quality analysis is performed by the process set forth in the flow chart of FIG. 3. The process starts at step S300 and advances to step S310 where at least one specific digital test pattern, which can either be in hardcopy original form or a digital image stored in memory 36, is provided. Preferably, multiple different test patterns are used to analyze various components relevant to a determination of image quality. Flow then proceeds to step S320 where a corresponding hardcopy output of the test pattern is generated. This can be by outputting a printed hardcopy output from output station 26 using the digital test pattern as an input when the test pattern is stored in digital form, such as in hard disk 36 or floppy disk 38. Alternatively, an accurate original hardcopy test pattern may be placed at scanner 20 and scanned into the digital copier 10 to form a digital test pattern, which can be used as an input to output station 26 to form the hardcopy output. Then, flow advances to step S330 where the hardcopy output is scanned by scanner 20 to form a digital raster image for analysis purposes.

After step S330, flow advances to step S340 where the digital image is preferably acted on by pattern recognition software, which can be located within hard disk 36 or floppy disk 38 and is associated with image quality analysis module 70, to determine a precise location of various test elements within the scanned digital raster image. This software uses a Hough or similar transform to automatically detect locator marks on the image. A suitable pattern recognition system for use with the invention can be found in U.S. Pat. No. No. 5,642,202 to Williams et al., owned by the assignee of the present invention, the disclosure of which is incorporated herein by reference in its entirety. Alternatively, or in conjunction therewith, the test pattern may include encoded information that signifies a particular test pattern. The copier machine 10 may have hardware/software to decipher the particular encoded information embedded into the test pattern. The memory of the copier 10 may also be provided with a script file corresponding to each possible test pattern or test detailing the contents of the script and associated test pattern, as well as detailing the particular image quality analysis routine to be used to measure a particular part of overall image quality. A more detailed description of such a scripted test pattern can be found in U.S. Ser. No. 09/450, 182 to Rasmussen et al., filed concurrently herewith, entitled "Method to Allow Automated Image Quality Analysis of Arbitrary Test Patterns", the subject matter of which is incorporated by reference herein in its entirety.

After step S340, the process flows to step S350 where image quality analysis is performed on the test image using image quality analysis module 70. From step S350, flow advances to step S360 where a determination is made by the image quality analysis module 70 whether the image quality for this particular test image is acceptable. If it is, flow advances to step S380 where the process stops. However, if the image quality is not acceptable, flow advances from step S360 to step S370 where a call can be made to a diagnostic facility. This call may be an automatic service call made through modem 48 for scheduling an actual service visit by a service technician to correct the noted problems. Alternatively, it may be a call to a more sophisticated diagnostic module 80 located locally or at the remote facility that can further analyze the image quality problem along with values from various sensors and settings on the copier 10. This would provide corrective feedback to the digital copier 10, such as through modem 48 when module 80 is remotely located, allowing the digital copier 20 to adjust itself within acceptable parameters.

Figure 4:
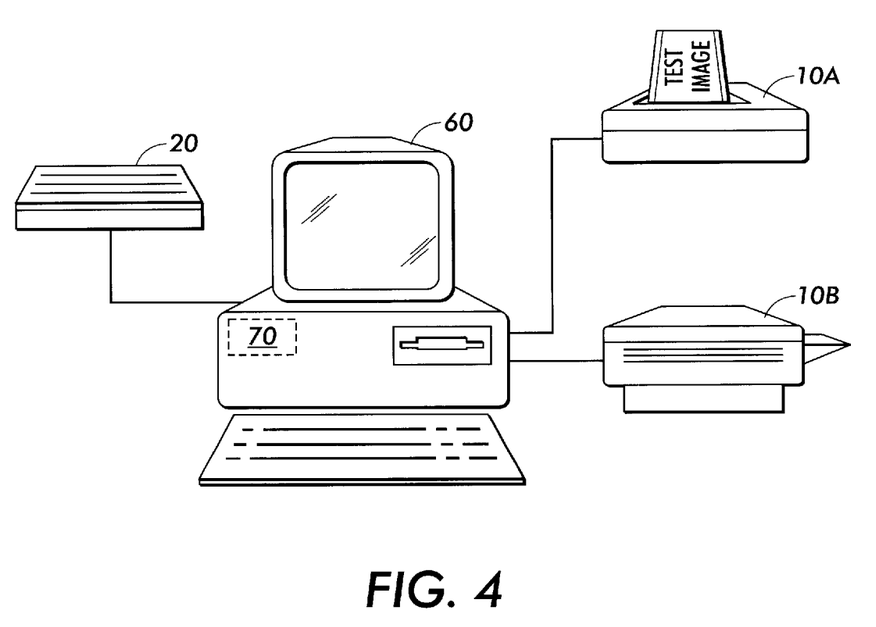
FIG. 4 is an alternative image output device and image analysis system according to the invention.

Alternatively, the image quality analysis module 70 may be remote from image output device 10. An example of which is illustrated in FIG. 4 where image output devices are in the form of printers 10A, 10B which are associated with a personal computer 60 through appropriate data cables. A flat bed scanner 20 is also associated with personal computer 60 and image quality analysis module 70 is in the form of software provided in personal computer 60. This embodiment operates as the previous embodiment in that the printers 10A, 10B (which ever is being tested) are given a digital test pattern to generate a hardcopy output from. This hardcopy output is then placed in scanner 20 to generate the digital test image. This digital test pattern is then analyzed to determine image quality of the printer.

While shown in FIG. 4 to be loosely associated, the invention can also be practiced with completely discrete components, such as a separate printer, scanner and computer or other source for containing image quality analysis module 70. In this case, the hardcopy output from the printer can be provided to a non-associated scanner for scanning. Then, the digital test image from the scanner can be stored or converted onto a portable recording medium, such as a floppy disk and provided to a non-associated computer having the image quality analysis module.

The test pattern used can be one of several test patterns designed to provide evaluation of a particular parameter relevant to image quality analysis of the output of the printing system, such as color registration, motion quality, micro and macro uniformity, color correction, and font quality. This overall analysis is performed using human perception modeling so that not only physical measures of the image are determined, but also measures that quantify quality as perceived by a human observer. That is, rather than having the analysis merely compare a scanned image to an original or to determine some level of variation or deviation from a given norm that may or may not rise to the level of a perceived image quality issue when view by a human observer, the image quality analysis incorporates human visual perception models, and the knowledge about the quality as perceived by a human observer can be used in conjunction with information from machine sensors and settings to make decisions on the necessary corrective action. At a simple level, this can be achieved by passing the image through a band-pass filter known to be similar in resolution to that achieved by a human vision system. More sophisticated modeling can also be used.

This particular invention relates specifically to determination of color non-uniformity, which forms a part of the overall image quality analysis. For a more detailed description of the overall image quality analysis system, see co-pending U.S. Ser. No. 09/450,185 to Rasmussen et al., filed concurrently herewith, entitled "Virtual Tech Rep By Remote Image Quality Analysis", the disclosure of which is incorporated herein by reference in its entirety.

One application of such an image quality analysis system is for measurement of absolute image quality levels, for example as part of a quality assurance inspection system. For this application it is important that the IQ can be evaluated in a manner that is applicable across all printing technologies (electrophotography, lithography, ink-jet, etc.) and that the metric produces values that directly correlate with the human visual impression of the uniformity. As such, comparisons can be made across various product lines with a common IQ value.

A significant step to assure correlation with human visual perception is that a Visual Transfer Function of the human visual system is taken into account. For example, see co-pending U.S. Ser. No. 09/450,183 to Rasmussen et al.

filed concurrently herewith, entitled "Method to Obtain Consistent Image Quality Measurements From Different Image Input Devices", the subject matter of which is incorporated herein in its entirety by reference. However, even if such methods are employed, human observers respond quite differently to variations in the different categories listed above. For example, given variations in category (a) and (c)which are equally perceptible, the human psychological response can be quite different. That is, variations in category (a) would typically be less objectionable due to their ordered appearance. For this reason it is imperative to be able to automatically separate the image variation into components of different categories, otherwise the metric will provide a determination of image quality that does not correspond to or predict IQ as seen by the human observer.

This metric is also useful as part of a system for machine diagnostics. In this case, images from a printer/copier would be scanned back by a stand-alone scanner or a scanner associated with the printer/copier, and fed into an image analysis module, which would then quantify different types of non-uniformities and use this as a basis for diagnosing machine problems. For this application it is also very important to be able to distinguish between non-uniformities in the different categories. For example, variations in category (a) would be a result of the normal operation of the printer and not require any corrective action, while excessive variations in category (c) would be a diagnostic signal that the printer needs service. If separation between (a) and (c) is not made, the color variation caused by halftone screens could dominate the overall signal, and small but important variations caused by process noise may go undetected, resulting in ineffective diagnosis of printer/copier operation.

Figure 5:
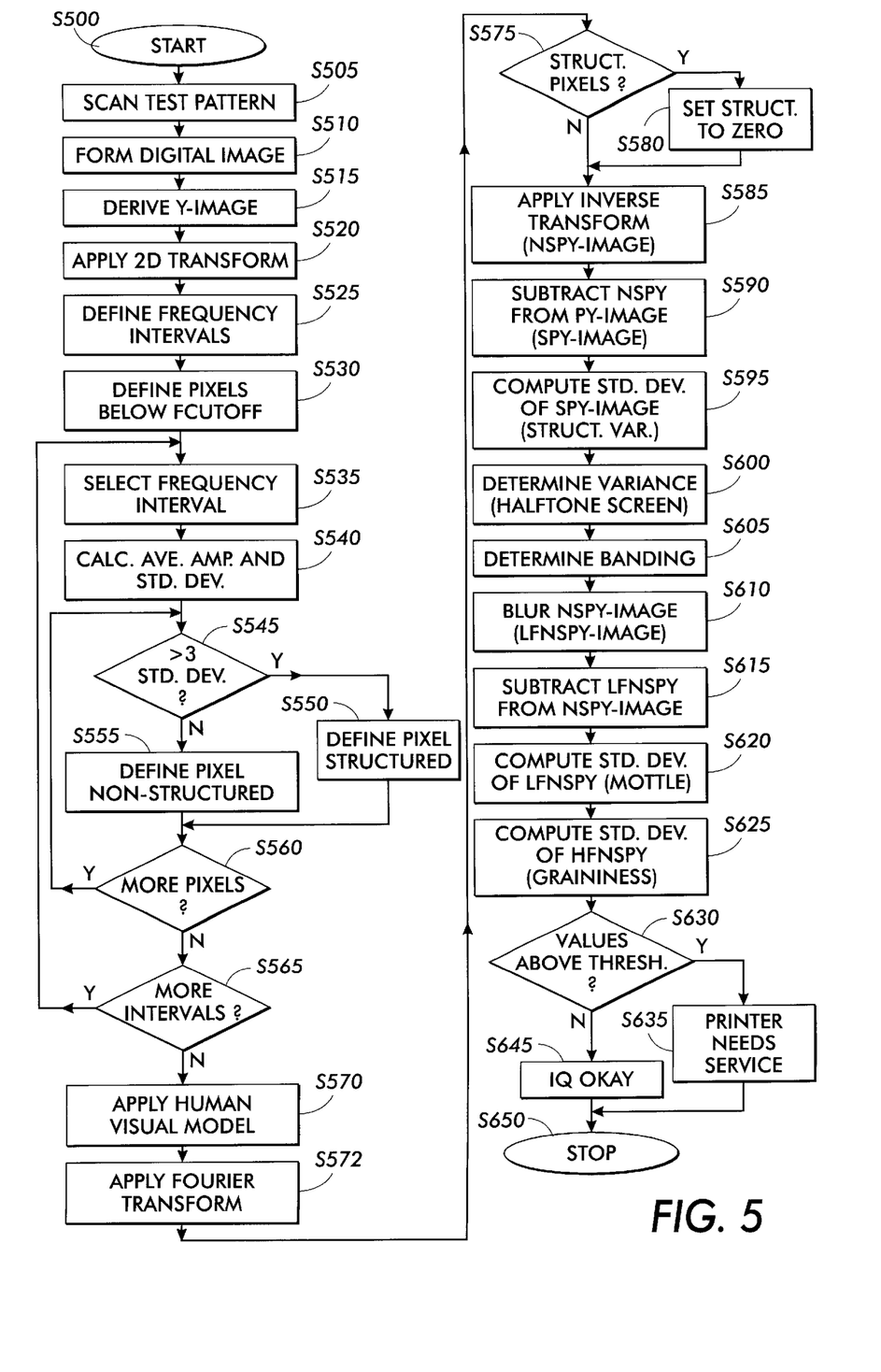
FIG. 5 is a flow chart showing an exemplary process for determining and characterizing color non-uniformity.

A more detailed description of the IQ analysis process follows with reference to FIG. 5. The process starts at step S500 and proceeds to step S505 where a hardcopy print sample forming a test pattern is scanned, typically by an RGB color flat bed scanner 20 that may be a stand-alone scanner (FIG. 4) or part of the copier itself (FIG. 2). Then, the process advances to step S510 where the scanned image is captured digitally to form an "RGB image" of the area of the print sample, the uniformity of which is to be analyzed. Then, at step S515, a standard color calibration technique is applied to the RGB image. Techniques for color calibration that are commonly used in combination with ICC profiles can be used for this purpose, for example interpolation using color lookup tables that transform RGB color space to CIELab color space. The RGB image is thus transformed to a monochrome image (Y-image) that represents the luminance of the image. Then, at step S520, a 2D fast Fourier transform is applied to the Y-image to form an FFT-image, which is a complex valued image, with its complex value being represented as an amplitude and a phase. The two-dimensional FFT transform is described for example, in "Numerical Recipes", by W.H. Press et al., Cambridge University Press 1988. Each pixel in the FFT-image corresponds to a specific frequency and direction in the Y-image. The maximum frequency, Fmax, is determined by the sampling resolution of the Y-image.

Then, the process advances to step S525 where a binary image mask is generated based on the FFT-image (by steps S525–S565). The mask defines a separation of the FFT-image into two components, corresponding to variations in the Y-image which are structured and non-structured, respectively. The binary image mask is defined as follows. At step S525, the frequency range from 0 to Fmax is split into a finite number of frequency intervals. The first frequency interval goes from 0 to a "low-frequency-cutoff", denoted Fcutoff. At step S530, pixels in the FFT-image with a frequency lower than the low-frequency-cutoff are all taken to represent non-structured variation, and are marked as such in the mask. Pixels in the remaining frequency intervals are analyzed statistically as follows (in steps S535–S565). A first frequency interval is selected at step S535. Then, the process advances to step S540 where for the given frequency interval, the average amplitude and the standard deviation of the amplitude are calculated for pixels in that interval. Then at step S545, for each pixel in the interval, it is determined which have an amplitude that exceeds the average by a certain threshold, for example, by more than 3 standard deviations. If the decision block is Yes at step S545, the process advances to step S550 where such pixels are taken to represent structured variations. If the decision block is No at step S545, the process advances to step S555 where the pixel is taken to represent a non-structured variation. In this way, a Fourier-space mask is created which separates the image into structured and non-structured variations. This is done before any further processing of the image. At step S560, if more pixels are present in the interval, the process jumps back to step S545. Otherwise, flow proceeds to step S565 where it is determined whether more intervals need to be analyzed. If there are more, the flow returns to step S535. Otherwise, flow advances to step S570. Note that the image is separated into the structured and non-structured variations prior to any human visual filters, which would make such a separation more difficult.

A significant step to assure correlation with human visual perception is that a Visual Transfer Function of the human visual system is taken into account. For example, see copending U.S. Ser. No. 09/450,183 to Rasmussen et al. filed concurrently herewith, entitled "Method to Obtain Consistent Image Quality Measurements From Different Image Input z Devices", the subject matter of which is incorporated herein in its entirety by reference. However, even if such methods are employed, human observers respond quite differently to variations in the different categories listed above. For example, given variations in category (a) and (c)which are equally perceptible, the human psychological response can be quite different. That is, variations in category (a) would typically be less objectionable due to their ordered appearance. For this reason it is imperative to be able to automatically separate the image variation into components of different categories, otherwise the metric will provide a determination of image quality that does not correspond to or predict IQ as seen by the human observer.

From step S570, the PY-image is now Fourier transformed at step S572 and separated into structured and non-structured variations, using the mask constructed as described above. Then after step S572, the process advances to step S575 where pixels in the amplitude spectrum which are marked by the mask as corresponding to structured variation are found. In particular, if a particular pixel is found to be structured, flow advances to step S580 where the value of this pixel is set to zero. From steps S575 and S580, the process advances to step S585 where an inverse Fourier transform is then applied. This reconstructs the PY-image with only the non-structured variation remaining. The resulting image is denoted the "NSPY-image". Flow advances from step S585 to S590 where the NSPY-image is subtracted from the PY-image, to obtain an image which represents the perceived structure, denoted as the "SPY-image".

The SPY-image and the NSPY-image can now be further analyzed to obtain overall measures of the perceptible variation. From step S590, flow advances to step S595 where the standard deviation of the SPY-image is taken, which forms a measure of visible structured variation. The variation in the SPY-image contains both periodic components such as halftone screens, as well as isolated one-dimensional defects such as streaks or bands. For a given printer and halftoning mode, the amount of halftone screen is known. Thus, given this, at step S600, the method can determine the variance that is attributable to halftone screening using known techniques. Then, after the process advances to step S605, any excess variation can be interpreted by the system as caused by bands or streaks.

Further, image quality problems attributable to mottle or graininess can be determined. It is now advantageous to separate the variation of the NSPY-image further, into low-frequency and high frequency variations, corresponding to what is normally referred to as mottle and graininess, respectively. To do this, a blurring operation is applied to the NSPY-image at step S610. This is preferably obtained by convolution with a kernel that approximates a Gaussian point-spread function of full-width/half-max equal to 1.0 mm. The blurring operation results in an image representing the low-frequency non-structured perceived luminance, which is denoted as the LFNSPY-image. From step S610, flow advances to step S615 where the LFNSPY-image is subtracted from the NSPY-image to obtain an image that represents the high-frequency non-structured perceived luminance, which is denoted as the HFNSPY-image.

From step S615, flow advances to step S620 where the standard deviation of the LFNSPY-image is taken as an overall measure of the mottle, and then at step S625, the standard deviation of the HFNSPY-image is taken as an overall measure of the graininess. For a given printer, the normal levels of mottle and graininess measured as described above, are known or determinable. By comparing resultant levels with these normal threshold levels at step S630, levels that exceed these normal levels can be used to provide a diagnostic signal in step S635 that the printer may need service. This signal may be a local signal display to the human operator, stored in memory for subsequent review by a service technician, or forwarded to the remote diagnostic or service facility 60 through a network communication interface, such as modem 48 in FIG. 2. If, however, the values are below the threshold, flow advances from step S630 to S640 where it is determined that the image quality is okay. The process then stops at step S645. Alternatively, after step S625, the resulting data may always flow to a diagnostic facility, where they can be used in conjunction with other information from machine sensors and settings, to determine whether corrective action should take place.

With the invention, not only are color uniformity problems recognized, but these problems are isolated and characterized into particular types, such as (a) structured non-uniformity, (b) low-frequency unstructured non-uniformity, and (c) high-frequency unstructured non-uniformity. With this additional information, more effective diagnostic procedures can be taken to remedy any noted problems. This diagnosis can be performed either manually by a service technician using this information, or the detailed IQ analysis information may be provided to a diagnostic engine from which problems can be specifically pinpointed and steps taken to correct for the noted color non-uniformity.

The present invention has been described with reference to specific embodiments, which are intended to be illustrative and non-limiting. Various modifications can be made to the invention without departing from the spirit and scope of the invention as defined by the appended claims.

The key elements of the invention are as follows.
(a) The separation of the image variation into structured and non-structured components, based on statistical analysis of the 2-dimensional amplitude spectrum, to identify those pixels which have a significantly higher value than most other pixels corresponding to the same absolute frequency.
(b) Determining, but not applying, this separation in Fourier space, before any visual filter has been applied to the image, and thus while even high-frequency structured non-uniformities appear as easily detectable, strong peaks in the amplitude spectrum.
(c) Applying a human visual filter to the color calibrated image, followed by a separation of the human visually filtered image into structured and non-structured components, thus allowing the human visual filter to take into account visual masking effects, such as for example the masking of noise by a halftone screen.
(d) Post-processing of the resulting structured and non-structured images to further categorize the non-uniformities, for example into low- and high-frequency variations. Examples of straight-forward extensions to the analysis method include the following.
(a) The color calibration applied to the original RGB image may result in a more general full color image (rather than a luminance image), for example an image in XYZ color space.
(b) To cover situations where chrominance variations are important, rather than just luminance variations, multiple images can be used to determine the mask (steps S525 through S565). For example, 3 masks can be determined independently from the 3 images corresponding to uncalibrated Red, Green, and Blue channels of an image input device, and the union of the 3 masks can be used for further processing.
(c) The filtering in step S570 can be based on a sophisticated human visual model, such as a model that operates on a calibrated XYZ image. Models mentioned previously are examples. When such a full color model is applied, the subsequent analysis (following step S595) will involve not only luminance, but full color calculations. For example, measurements of luminance variations may be replaced by measurements of $\Delta L^*$ or $\Delta E^*$.
(d) The post-processing described by steps S595 and later steps, can be extended to further categorize the non-uniformities. For example, the image that represents structured non-uniformities may be further divided. By applying a low-pass filter, similar to step S610, the non-uniformities caused by halftone screens will be eliminated, and the remaining non-uniformities can be taken to represent macro-uniformity problems such as streaks or moire.

What is claimed is:

1. An image quality analysis System for determination color non-uniformities in an image output device, comprising:
    a test pattern pertinent to image quality determination;
    a scanner that scans a hardcopy test image, which has been generated by the output device based on the test pattern, to form a digital raster image; and
    an image quality analysis module that receives the digital raster image, distinguishes one or more test targets from the digital raster image and detects color non-uniformities, uniformities, and performs image quality analysis on the test budgets to obtain results quantifying image quality,
    wherein the image quality analysis module includes means for categorizing detected color non-uniformities as either structured or non-structured variances, the means for categorizing including:
  means for converting the image to a complex valued image represented as an amplitude and phase; and
  means for generating a binary image mask from the complex valued image by dividing a frequency range of the complex valued image into at least a low range and a high range,
  wherein pixels of the image in the low range arc categorized as non-structured variances and pixels of the image in the high range are compared against average amplitude and standard deviation and categorized as structured variances if the comparison deviates by more than a predetermined threshold.

2. The image quality analysis system of claim 1, wherein the structured variances are further categorized into periodic components and one-dimensional components.

3. The image quality analysis system of claim 1, wherein the means for categorizing includes image converting means for converting a color image to a monochrome image representing luminance.

4. The image quality analysis system of claim 3, wherein the means for categorizing further includes means for calculating average amplitude and standard deviation for pixels of the monochrome image.

5. The image quality analysis system of claim 1, wherein the image quality analysis module further includes means for applying a human visual model to the digital raster image.

6. The image quality analysis system of claim 1, wherein the image quality analysis module resides locally at a site of the image output device.

7. The image quality analysis system of claim 6, wherein the image output device is a digital copier that contains the scanner.

8. The image quality analysis system of claim 6, further comprising a communication module that connects the image quality analysis module to a remote facility.

9. The image quality analysis system of claim 1, wherein the scanner and the image quality analysis module reside remote from the image output device.

10. The image quality analysis system of claim 1, further comprising a diagnostic module that can diagnose and correct color non-uniformities detected and categorized by the image quality analysis module.

11. A method of performing image quality analysis on an image output device having an output station that generates a hardcopy image from a digital image, the method comprising:
  generating a hardcopy image output from the image output device based on a predetermined test pattern;
  scanning the hardcopy image using a scanner to form a digital raster image;
  performing image quality analysis on test targets of the image to determine color non-uniformities; ; and
  categorizing determined color non-uniformities into structured and non-structured variances, wherein the categorizing includes:
    converting the image to a complex valued image represented as an amplitude and phase;
    generating a binary image mask from the complex valued image by dividing a frequency range of the complex valued image into at least a low range and a high range;
    categorizing pixels in the low range as non-structured variances; and
    comparing pixels in the high range with average amplitude and standard deviation and categorizing pixels as structured variances if the comparison deviates by more than a predetermined threshold.

12. The method of claim 11, comprising further categorizing the color non-uniformities into periodic components and one-dimensional components.

13. The method of claim 11, further comprising applying a human visual filter to the image.

14. The method of claim 13, wherein the step of categorizing into structured and non-structured variances occurs prior to applying the human visual filter.

15. A method of performing image quality analysis on an image output device having an output station that generates a hardcopy image from a digital image, the method comprising:
  generating a hardcopy image output from the image output device based on a predetermined test pattern;
  scanning the hardcopy image output from the image output device based on a predetermined test pattern;
  scanning the hardcopy image using a scanner to form a digital raster image having one or more test targets;
  performing image quality analysis on the test targets to determine color non-uniformities;
  categorizing determined color non-uniformities into structured and non-structured variances;
  after categorizing the determined color non-uniformities, applying a human visual filter to the image; and
  separating the human visual filtered image into structured and non-structured components.

16. The method of claim 15, further comprising categorizing the structured and non-structured components into low and high frequency variations.

17. The method of claim 11, wherein the step of performing image quality analysis includes converting the digital raster image from a color image to a monochrome image representing luminance.

18. A method of performing image quality analysis on an image output device having an output station that generates a hardcopy image from a digital image, the method comprising:
  generating a hardcopy image output from the image output device based on a predetermined test pattern;
  scanning the hardcopy image using a scanner to form a digital raster image;
  performing image quality analysis on test targets of the image to determine color non-uniformities by converting the digital raster image from a color image to a monochrome image representing luminance and calculating average amplitude and standard deviation for pixels of the monochrome image over a predefined frequency range;
  categorizing determined color non-uniformities into structured and non-structured variances; and
  categorizing individual pixels as structured or non-structured based on a comparison of the individual pixel with the calculated standard deviation.

19. The method of claim 18, further comprising applying an inverse transform to non-structured pixels and subtracting the resultant NSPY image from the monochrome image to form a SPY image.

20. The method of claim 19, further comprising determining banding or halftone screening from the SPY image.

21. The method of claim 19, further comprising blurring the NSPY image and determining mottle and graininess.

22. The method of claim 1, further comprising providing the categorized structured and non-structured variations of color non-uniformity to a diagnostic module to correct the color non-uniformity.

* * * * *